Sept. 27, 1932.   G. A. COUNTRYMAN   1,879,979
FRAME STRAIGHTENING TOOL
Filed Jan. 16, 1930   3 Sheets-Sheet 3
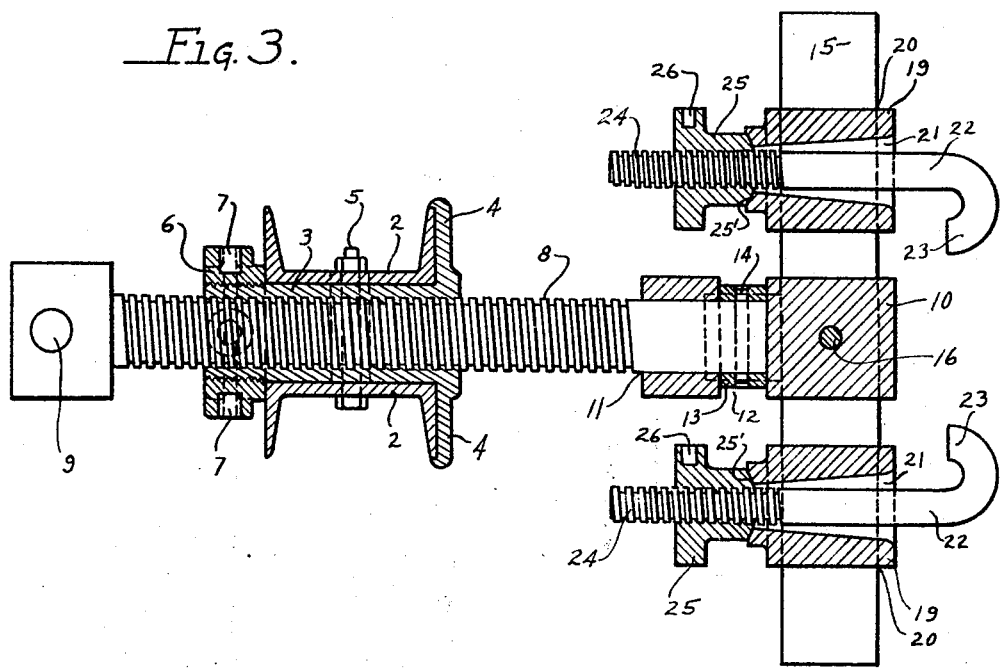
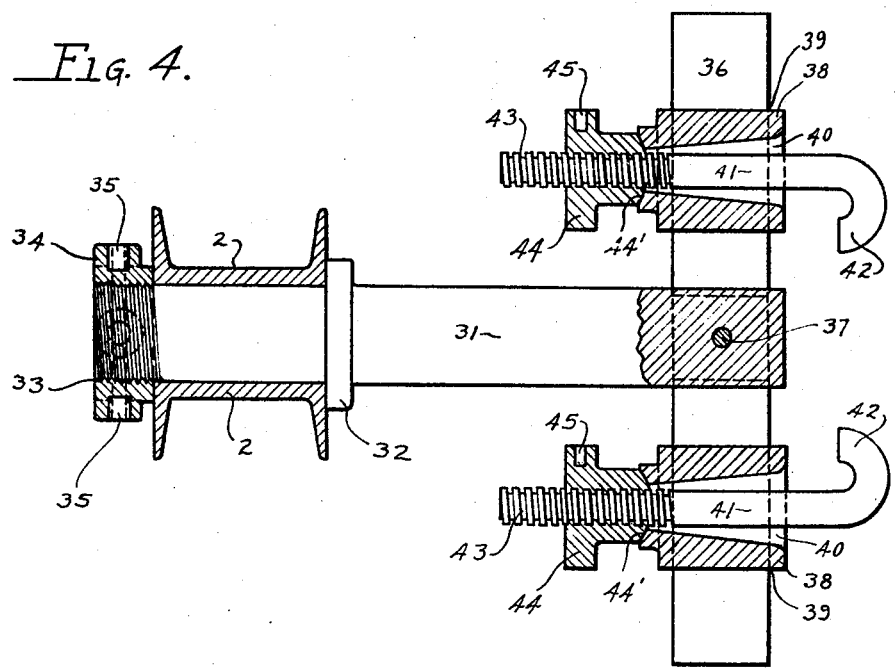
INVENTOR
Guy A. Countryman.
BY Toulmin & Toulmin
ATTORNEY Patented Sept. 27, 1932

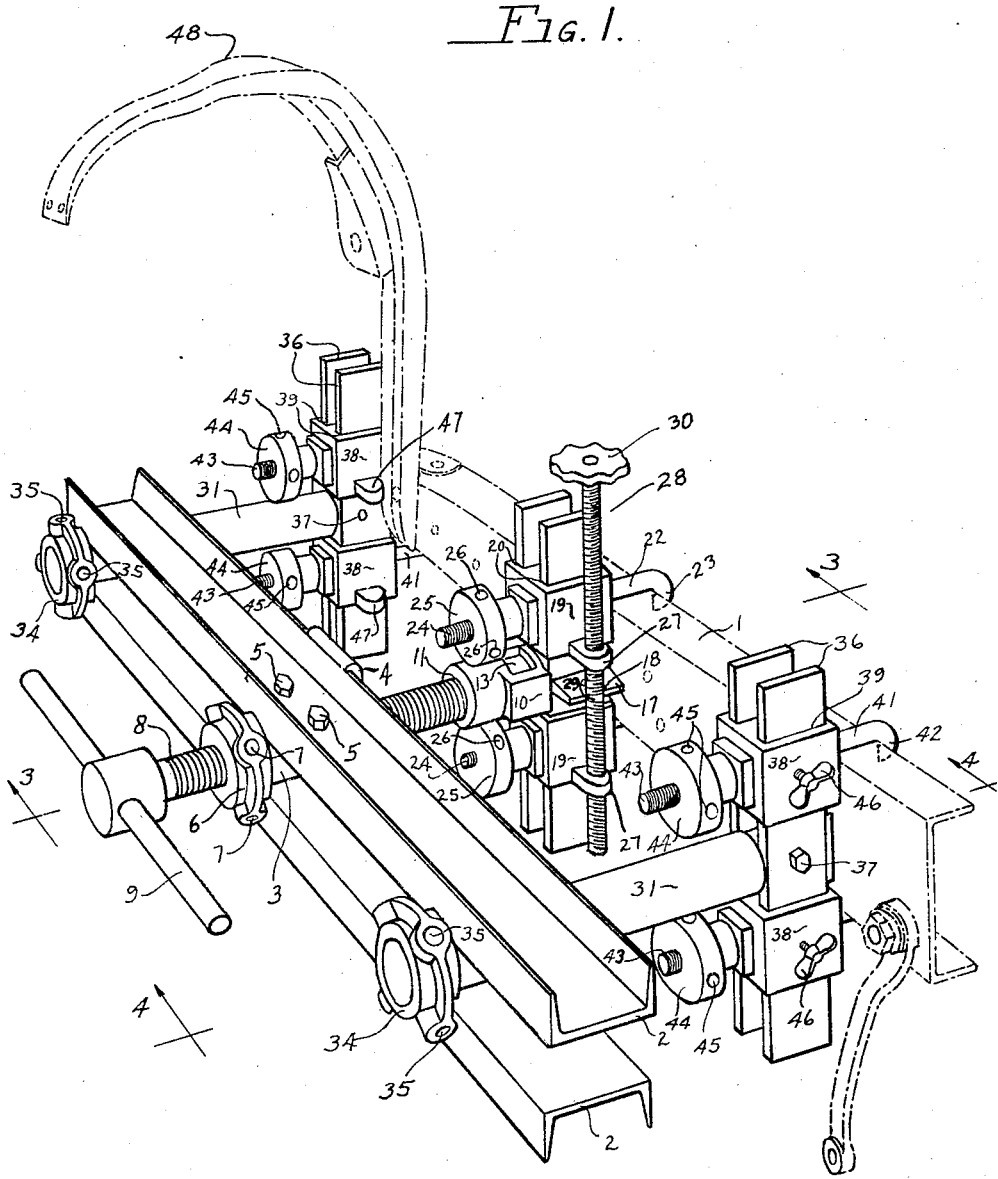

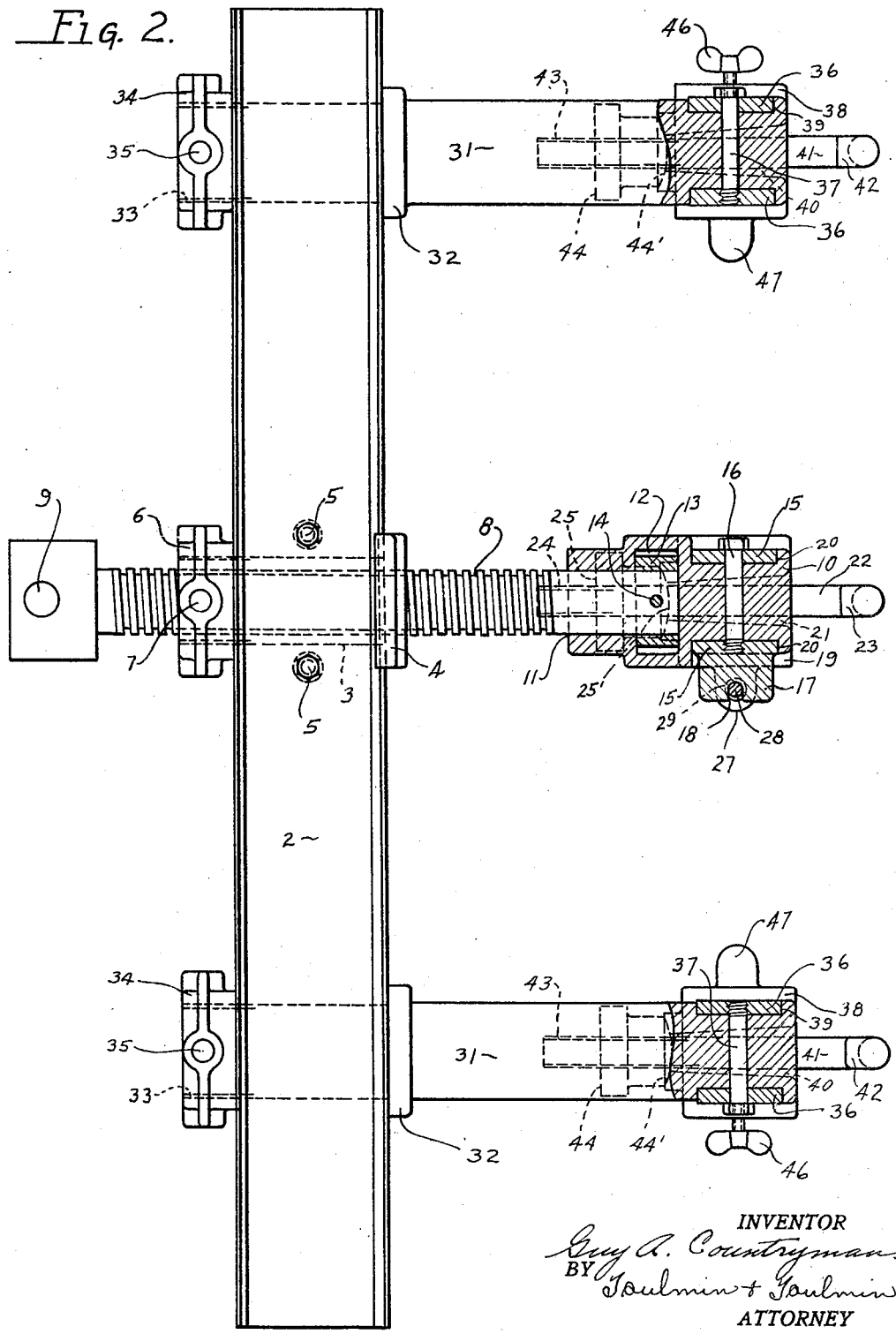

1,879,979

UNITED STATES PATENT OFFICE

GUY A. COUNTRYMAN, OF ASHLAND, OHIO

FRAME STRAIGHTENING TOOL

Application filed January 16, 1930. Serial No. 421,090.

This invention relates to improvements in tools for use in straightening bars and frames, and particularly frames of automobiles.

It is the object of this invention to provide a tool that may be easily attached to and removed from the frame of an automobile for the purpose of straightening the part of the frame to which the tool is attached.

It is also an object of this invention to provide a tool of this kind that is easily handled, easily applied to the parts to be straightened and easily removed therefrom, and when applied to the frame of an automobile for the purpose of straightening the frame it is effective for accomplishing that purpose.

It is particularly the object of this invention to provide a tool of this kind adapted to grip two parts of a frame for holding purposes, and apply pressure to another and intervening part so that the part between the gripping bars may be straightened.

These and other advantages will appear from the following description taken in connection with the drawings.

Referring to the drawings:

Figure 1 is a perspective view of the tool applied to the frame of an automobile.

Figure 2 is a top plan view of the tool as a whole showing the gripping elements in section.

Figure 3 is a section on the line 3—3 of Figure 1.

Figure 4 is a section on the line 4—4 of Figure 1.

In Figure 1 the tool is shown applied to the frame 1 of an automobile. While this tool is shown applied to part of the frame of an automobile it is well adapted for use in straightening bars and rods and even railroad irons, or anything else of a similar nature or character.

The frame part of the tool is composed of two channel irons 2. Near the center of these channel irons and between them is a sleeve 3 which has on one end oppositely extending flanges 4 engaging one side of each of the channel irons. The channel irons are held to this sleeve by means of bolts 5, one on each side of the sleeve and adjacent it. Each bolt has thereon a long washer engaging each channel iron to hold the channel irons in spaced relation in cooperation with the sleeve. On the end of the sleeve opposite the flanges is a nut 6 screw threaded on the threaded end of the sleeve. In this nut 6 is a series of radially arranged holes 7 for receiving tools by which the nut may be rotated so that the channel irons are gripped between the flanges 4 and the nut 6. When the channel irons are thus securely held together by means of the bolts and the sleeve the frame part of this tool is formed.

Extending through the sleeve is a screw threaded orifice or hole adapted to receive a screw shaft 8. On the outer end of the screw shaft is a handle 9 by which the screw shaft is rotated and made to travel through the sleeve. On the end of the screw shaft opposite the handle 9 is a head 10. This head is shown in section in Figure 2. In one end of this head there is a socket 11. The inner end of this socket passes into a recess 12. The purpose of this socket and recess is to receive the end of the screw shaft remote from the handle, and for the purpose of holding this end of the screw shaft within the head there is a cuff 13 fastened to the end of the screw shaft by means of a pin 14. On each side of the head is a bar 15 attached thereto at the central point by means of a bolt or screw 16.

Near the center of one of these bars and extending to one side is a flange 17 which has a slot 18 for the purpose of holding against longitudinal movement a screw to be later described. There are two of these bars, one on each side of the head, so that the bars extend from the head in parallel relation one to the other. These bars form guides for blocks 19, one on each side of the head. For the purpose of receiving the ends of the bars each block 19 is provided with slots 20, rectangular in shape.

Extending through each block at right angles to the slots is a hole 21. The inner ends of these holes are substantially round, while the outer ends thereof are enlarged vertically so that the screw hook members supported therein may have a certain degree of vertical swinging movement. The inner ends of these holes adjacent the part that is round are hollowed out to form sackets to receive and properly seat rounded surfaces formed on nuts. In each hole 21 is a screw hook 22 which has on its outer end a hook 23. The other end of this hook is threaded at 24 for receiving a nut 25. This nut 25 has on the inside thereof a rounded surface 25' adapted to seat in the socket heretofore mentioned on the inner end of the hole provided for the screw hook 21.

These hooks, as is shown in Figure 1, catch over the edges of the frame and when they are thus engaged with the frame the nuts 25 are threaded onto the hooks so that the hooks are forced against the frame by the rotation of the nuts 25. On account of the enlarged outer ends of the holes 21 these hooks may be easily applied to and removed from the frame or bar gripped thereby. In this position the bar is clamped between the hooks and the blocks 19 so that upon turning of the screw shaft 8 this part of the frame may be moved. The nuts 25 have holes therein 26, for the insertion of tools by which the nuts may be rotated.

On each of the blocks is an ear 27 which has therethrough a screw threaded hole in which a screw 28 operates. These ears are on the same side of the blocks and the threads therein are oppositely threaded. Likewise, that part of the screw within each ear is oppositely threaded so that upon rotation of the screw the blocks are moved toward each other or away from each other, depending upon the rotation of the screw. The central part is reduced in size, as indicated by the numeral 29, and fits within the slot 18 in the flange 17 so that the screw will not move longitudinally during the process of rotation. On the upper end of the screw, as shown in Figure 1, is a handle 30 by which the screw may be rotated.

At each end of the frame between the channel irons is a rod 31. On each rod and against one side of the channel irons is a shoulder 32. The ends of the rods opposite the shoulders are threaded as indicated by the numeral 33 to receive a nut 34. The nuts, in cooperation with the shoulders 32, clamp the rods 31 upon the channel irons 2. These rods may be adjusted and placed in any position between the ends of the channel irons and the screw shaft located in the center thereof. Each nut is provided with a series of radially arranged holes 35 for receiving tools by which the nuts may be rotated.

On the other end of each rod 31 is a pair of parallel bars 36 held in spaced relation by the rod and fastened thereto by means of a pin 37. These bars are of the same general shape and structure as the bars attached to the screw shaft 8. Likewise, there is on each end of each set of parallel bars a block 38 which has arranged therein two parallel slots 39 for receiving the bars 36. At right angles to these slots each block has also a hole 40 therein to receive a screw hook 41. The outer ends of these holes 40 are flared to permit a vertical swinging movement of the hook therein. The inner ends of these holes are substantially round and have provided in the inner walls of the blocks a circular seat to accommodate a ball 44' located on the inner end of the nut 44. The hook part is indicated by the numeral 42 while the other end is threaded as indicated by the numeral 43.

On the threaded ends of the screw hooks are nuts 44 having radial holes 45 for the reception of tools by which the nuts may be rotated. When the hooks are engaged over a part of the frame, as indicated in Figure 1, and the nuts tighten the frame is gripped between the hooks and the blocks and securely held. There is one of these gripping members at each end of the frame, which engages and grips the frame at points opposite the screw threaded gripping member. When the tool is in the position as indicated in Figure 1 and the hooks are all in close gripping engagement with the member the rotation of the screw shaft 8 causes the central or intermediate gripping members to pull or push, owing to the direction of rotation of the screw. This pulling or pushing will straighten the bar and remove therefrom any crooks, kinks or twists that may be therein.

For the purpose of adjusting the blocks 38 lengthwise of the bars 36 there is provided a thumb screw 46 in each block. When the blocks are properly adjusted this screw is tightened so that the blocks are held against movement longitudinally of the bars. By this means the hooks may be adjusted in relation to each other to suit the width of the bar or frame to be straightened. When the blocks are thus properly adjusted the screws are positioned and tightened. The operation of the screws may be effected for straightening the bar to which the tool is attached.

Instead of using thumb screws for the purpose of holding the blocks in position on the bars a screw member similar to that used in connection with the bars 15 may be applied. For this purpose there is shown on two of the blocks ears 47. These ears may be provided with screw holes for the reception of a screw similar to that shown in connection with the blocks 19. While these ears are only shown at one end of the tool they are applied to the other end of the tool but not visible. The numeral 48 is used to indicate a fender bracket. By means of this fender bracket the relative position of the tool on the frame of an automobile is indicated.

While this tool is shown on the front part of the frame of an automobile, it may be applied to any part of the frame and the frame straightened, and kinks and other misformations taken from the frame. Even if the frame should be warped or twisted the parts may be readily aligned, one part with another, with this tool merely by manipulating one of the nuts on the screw hooks.

In order to operate the tool each end is first attached to the frame and properly adjusted thereon to the width of the frame and geared to the length of the bend in the frame. After the ends are properly adjusted the central gripping member is attached to the frame, and after these parts are each attached to the frame the operation of the screw shaft 8 will cause the central gripping member to move the frame one way or the other between the outer gripping members so that this part of the frame may be straightened.

When any one part of the frame is thus straightened the tool may be removed and carried to a place upon another part and it likewise straightened. The tool is simple and easily handled and managed. All that is necessary to attach it to and remove it from the frame is to rotate six nuts, whereby the screw hooks are released. After they are released the tool can be carried from that point of application to another. Then by applying the hooks to the part of the frame to which it is to be attached and rotating the nuts the tool is again attached to the frame and can be operated for straightening that part of the frame to which it is then attached.

I desire to comprehend within my invention such modifications as may be clearly embraced within my claims and the scope of my invention.

Having thus fully described my invention, what I claim is new and desire to secure by Letters Patent, is:

1. In a tool of the class described, a frame composed of a pair of channel irons held in spaced parallel relation to each other by a threaded sleeve and a pair of bolts adjacent the center thereof, a shaft threaded into said sleeve, a handle on one end of said shaft and a gripping means on the other end consisting of a swivel head, a pair of parallel bars attached at their centers to said head, a block slidably mounted on each end of said bars and an adjustable and rotatable hook member extending through each block between the bars to grip a bar, and means mounted on each end of the frame to grip said bar on each side of said first named gripping means.

2. In a tool of the class described, a frame, a threaded sleeve attached to the center of said frame, a shaft threaded into said sleeve, operating means on one end of said shaft, a gripping means on the other end thereof, said gripping means consisting of a head swiveled to said shaft, a pair of spaced parallel bars attached at their centers to said head, and a pair of rotatable longitudinally and laterally adjustable swinging hook members on said bars, and a gripping means on each end of said frame.

3. In a tool of the class described, a frame, a threaded sleeve attached to the center of said frame, a shaft threaded into said sleeve, operating means on one end of said shaft, a gripping means on the other end thereof, said gripping means consisting of a head swiveled to said shaft, a pair of spaced parallel bars attached at their centers to said head and a pair of rotatable longitudinally and laterally adjustable swinging hook members on said bars, and a laterally and longitudinally adjustable gripping means on each end of said frame.

4. In a tool of the class described, a frame, a threaded sleeve attached to the center of said frame, a shaft threaded into said sleeve, operating means on one end of said shaft, a gripping means on the other end thereof, said gripping means consisting of a head swiveled to said shaft, a pair of spaced parallel bars attached at their centers to said head and a pair of rotatable longitudinally and laterally adjustable swinging hook members on said bars, and a gripping means on each end of said frame, said gripping means including a pair of longitudinally and laterally adjustable hook members.

5. In a tool of the class described, a frame, a threaded sleeve attached to the center of said frame, a shaft threaded into said sleeve, operating means on one end of said shaft, a gripping means on the other end thereof, said gripping means consisting of a head swiveled to said shaft, a pair of spaced parallel bars attached at their centers to said head and a pair of rotatable longitudinally and laterally adjustable swinging hook members on said bars, and a laterally adjustable gripping means on each end of said frame, said gripping means including a pair of longitudinally and laterally adjustable hook members.

6. In a tool of the class described, a frame, a shaft supported transverse the center of said frame, means for moving said shaft longitudinally, gripping means on one end of said shaft, said gripping means consisting of a head swiveled to said shaft, a pair of spaced parallel bars attached to said head at their centers, a block member adjustably mounted on each end of said bars, means to adjust said block members, and a swinging clamp member adjustably and rotatably mounted on each block, and a gripping member on each end of said frame.

7. In a tool of the class described, a frame, a shaft supported transverse the center of said frame, means for moving said shaft longitudinally, gripping means on one end of said shaft, said gripping means consisting of a head swiveled to said shaft, a pair of spaced parallel bars attached at their centers to said head, a block member having slots therein to receive said bars and a hole at right angles to said slots, said block being adjustably mounted on each end of said bars, common means to adjust said block members to and from each other, and a gripping member adjustably mounted in each hole, and a gripping member on each end of said frame.

8. In a tool of the class described, a frame, a shaft supported transverse the center of said frame, means for moving said shaft longitudinally, gripping means on one end of said shaft, said gripping means consisting of a head swiveled to said shaft, a pair of spaced parallel bars attached at their centers to said head, a block member having slots therein to receive said bars and a hole at right angles to said slots, said block being adjustably mounted on each end of said bars, an ear having a threaded hole therein on each block member, a screw in said holes to adjust said block members to and from each other, and a gripping member adjustably mounted in each hole, and a gripping member adjustably mounted on said frame on opposite sides of said shaft.

9. In a gripping device, a head having oppositely extending parallel guide bars, a pair of blocks slidably mounted on said bars, each block having a hole therein substantially perpendicular to the edges and parallel to the sides of said bars, said holes being flared from one end to the other, and having at their non-flared ends circular seats, a threaded hook member in each hole with the hook part adjacent the flared end of the hole, and a nut on the threaded part of said hook member, said nut having on one end a rounded surface to engage a seat so the hook member can freely rotate and move in said hole.

10. In a gripping device, a head including a pair of parallel bars united at their centers, a pair of blocks having slots therein to receive said bars slidably mounted one on each end of said pair of bars, each block having a flared hole therein between and perpendicular to the slots and a circular seat at the non-flared end of said hole, a threaded hook member in each hole with the hook adjacent the flared end of the hole, a nut on said hook member, said nut having a rounded surface thereon to engage said seat, and means to adjust said blocks to and from each other.

11. In a tool of the class described, a frame, a gripping means comprising a pair of adjustable swinging hook members adjustable longitudinally of said frame supported on each end of said frame for gripping and holding two parts of a bent frame, and a transversely adjustable gripping means comprising a pair of rotatable and longitudinally adjustable swinging hooks supported adjacent the center of said frame for gripping and moving a part of said bent frame between the parts gripped by the first named gripping means whereby the bent frame may be straightened.

12. In a tool of the class described, a frame composed of a pair of spaced parallel channel irons united at their centers, a gripping means comprising a pair of adjustable swinging hook members adjustable longitudinally of said frame supported on each end of said frame for gripping and holding two parts of a bent frame, and a transversely adjustable gripping means comprising a pair of rotatable and longitudinally adjustable swinging hooks supported adjacent the center of said frame for gripping and moving a part of said bent frame between the parts gripped by the first named gripping means whereby the bent frame may be straightened.

13. In a tool of the class described, a frame composed of a pair of spaced parallel channel irons united at their centers by a sleeve and a pair of bolts, a gripping means adjustable longitudinally of said frame supported on each end of said frame, each gripping means comprising a pair of swinging hook members for gripping and holding two parts of a bent frame, and a transversely adjustable gripping means supported in said sleeve for gripping and moving a part of said bent frame between the parts gripped by the first named gripping means whereby the bent frame may be straightened, said last-named means including a pair of rotatable swinging longitudinally adjustable hooks.

In testimony whereof, I affix my signature.

GUY A. COUNTRYMAN.